US010877931B1

(12) United States Patent
Nadiminti et al.

(10) Patent No.: US 10,877,931 B1
(45) Date of Patent: Dec. 29, 2020

(54) BACKUPS OF FILE SYSTEM INSTANCES HAVING SUBTREES

(71) Applicant: HEWLETT PACKARD ENTERPRISE DEVELOPMENT LP, Houston, TX (US)

(72) Inventors: Syama Sundararao Nadiminti, Bangalore (IN); Keshetti Mahesh, Bangalore (IN); John Michael Czerkowicz, Wakefield, MA (US); Peter Thomas Camble, Bristol (GB); Ieuan James Henry, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/568,451

(22) Filed: Sep. 12, 2019

(51) Int. Cl.
*G06F 16/14* (2019.01)
*G06F 16/178* (2019.01)
*G06F 16/11* (2019.01)
*G06F 16/13* (2019.01)
*G06F 16/901* (2019.01)

(52) U.S. Cl.
CPC .......... *G06F 16/152* (2019.01); *G06F 16/116* (2019.01); *G06F 16/122* (2019.01); *G06F 16/137* (2019.01); *G06F 16/1787* (2019.01); *G06F 16/9027* (2019.01)

(58) Field of Classification Search
CPC .... G06F 16/116; G06F 16/122; G06F 16/137; G06F 16/152; G06F 16/1787; G06F 11/1451; G06F 2201/82; G06F 16/9027
See application file for complete search history.

(56) References Cited

U.S. PATENT DOCUMENTS

| 8,051,113 | B1* | 11/2011 | Shekar | H04L 41/12 707/821 |
| 8,478,799 | B2 | 7/2013 | Beaverson et al. | |
| 8,489,612 | B2 | 7/2013 | Cherkasova et al. | |
| 8,595,237 | B1* | 11/2013 | Chaudhary | G06F 16/316 707/741 |
| 8,806,143 | B1* | 8/2014 | Cheng | G06F 3/0611 711/144 |
| 10,254,996 | B1 | 4/2019 | Jain et al. | |
| 2011/0022566 | A1* | 1/2011 | Beaverson | G06F 16/137 707/639 |
| 2011/0072059 | A1* | 3/2011 | Guarraci | G06F 16/27 707/823 |

(Continued)

OTHER PUBLICATIONS

Cohesity, "Cohesity Data Protection," White Paper, 2016, pp. 1-11.

(Continued)

*Primary Examiner* — James Trujillo
*Assistant Examiner* — Michal Bogacki
(74) *Attorney, Agent, or Firm* — Hewlett Packard Enterprise Patent Department

(57) ABSTRACT

Example implementations relate to backups to a secondary storage system of a file system instance that hierarchically relates data objects by content-based signatures to a root object and includes subtrees that correspond to respective inodes. In an example, a list of the content-based signatures is sent to the secondary storage system. Metadata and data of a subtree is stored into an item in the secondary storage system designated for the subtree.

24 Claims, 9 Drawing Sheets

(56) References Cited

U.S. PATENT DOCUMENTS

| | | | |
|---|---|---|---|
| 2013/0218934 A1* | 8/2013 | Lin | G06F 16/182 |
| | | | 707/828 |
| 2013/0339310 A1 | 12/2013 | Muller et al. | |
| 2014/0181579 A1* | 6/2014 | Whitehead | G06F 11/1451 |
| | | | 714/15 |
| 2014/0365740 A1 | 12/2014 | Vasilyev et al. | |
| 2015/0046398 A1 | 2/2015 | Camble et al. | |
| 2015/0269032 A1 | 9/2015 | Muthyala et al. | |
| 2016/0077924 A1 | 3/2016 | Todd et al. | |
| 2016/0170657 A1 | 6/2016 | Suehr et al. | |
| 2016/0202927 A1 | 7/2016 | Klarakis et al. | |
| 2016/0371297 A1* | 12/2016 | Okun | G06F 16/185 |
| 2017/0277602 A1* | 9/2017 | Kumar | G06F 11/1448 |
| 2017/0351695 A1* | 12/2017 | Rao | G06F 21/6218 |
| 2018/0367313 A1* | 12/2018 | Ostergaard | H04L 9/3236 |

OTHER PUBLICATIONS

Hewlett Packard Enterprise Development LP, "HPE StoreOnce Catalyst," Technical White Paper, 2018, pp. 1-17.

Hewlett Packard Enterprise Development LP, "Recovery Manager Central Concepts Guide," Jun. 2019, pp. 1-45, Part No. P13156-002b, Edition: 3.

Hewlett Packard Enterprise Development LP, "Veeam Backup & Replication on HPE SimpliVity 380," Technical White Paper, 2018, pp. 1-15.

\* cited by examiner

BACKUPS OF FILE SYSTEM INSTANCES HAVING SUBTREES

BACKGROUND

A computing system may store data, such as user files or operating system files. Some computing systems may be in communication with other computing systems via a network. The data may be replicated to one or more of the other computing systems.

BRIEF DESCRIPTION OF THE DRAWINGS

Various examples will be described below with reference to the following figures.

DETAILED DESCRIPTION

Figure 1A:
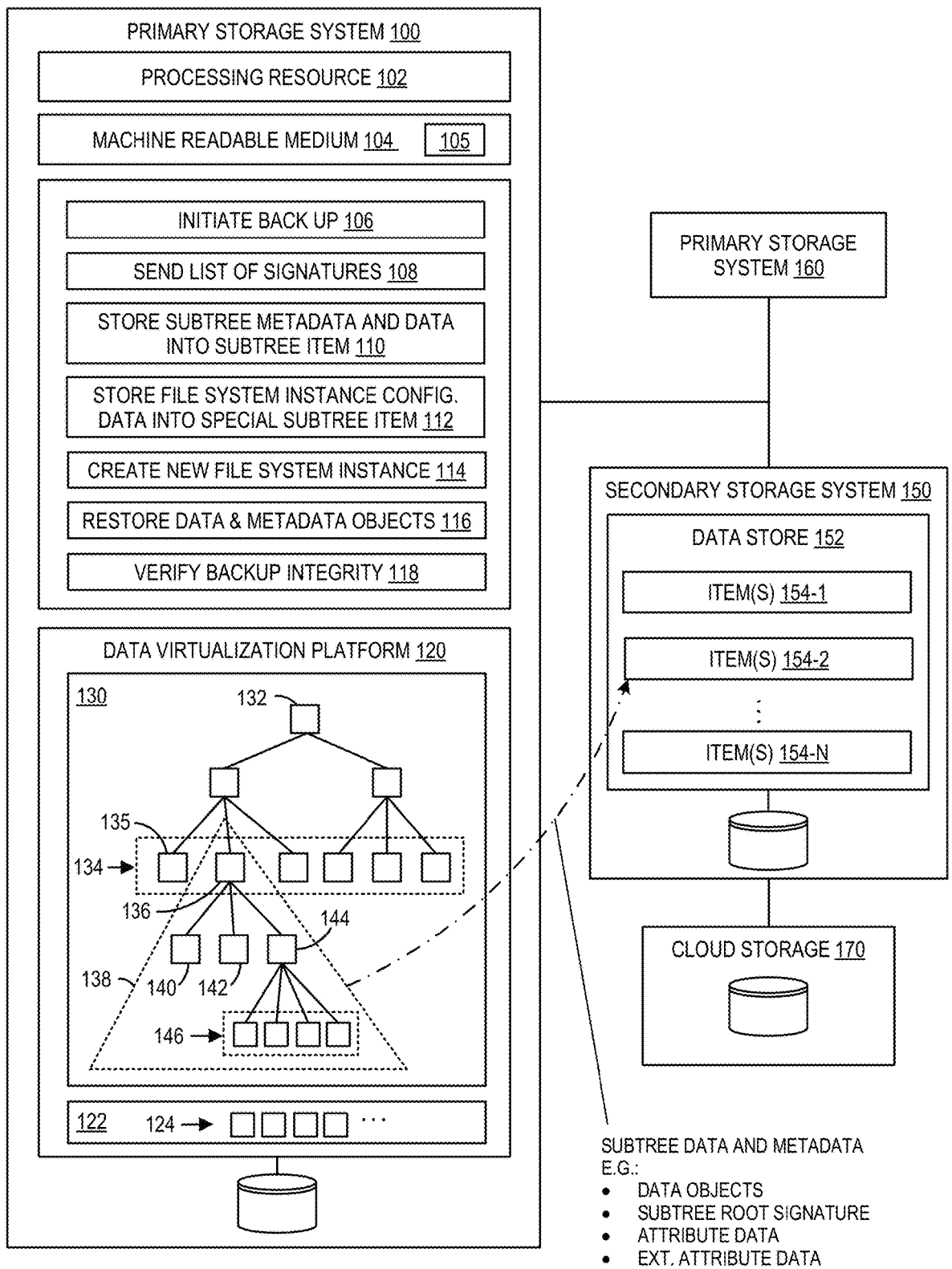
FIG. 1A depicts an example system to back up data to a secondary storage system.

Data may be stored on a system, such as a server, a storage array, a cluster of servers, a computer appliance, a workstation, a storage system, a converged system, a hyperconverged system, or the like. In some examples, data may relate to a virtual machine. Some systems may provide native data protection with another like system, such as back up and recovery between first and second like systems. A backup may include a copy of original data that can be used to restore the original data after a data loss event.

Native data protection between like systems, such as among hyperconverged systems having the same architecture, may take advantage of a tightly integrated set of shared features such as efficient deduplication and compression, to provide short backup windows, low Recovery Time Objective, and low Recovery Point Objective. However, utilizing data protection for back up and recovery between like systems may be costly (e.g., on a dollar per unit storage basis) or may compete with primary storage capacity needs on those systems. Moreover, certain regulations such as HIPAA may require users to utilize an "air gapped" backup solution, where backup or archival data is protected using a different technology than the storage technology of the system storing the primary data (also referred to herein as a primary storage system).

To address some of the foregoing considerations, some users may utilize a third-party solution. Some third-party solutions may run as a process or agent on the primary storage system and send backups of the primary data to a secondary storage system. However, such third-party solutions may not be as tightly integrated as data protection solutions of like systems as described above, and may be slower and less efficient. For example, some like systems may share a common architecture that natively deduplicates and compresses data transfers including back up and recovery operations between the like systems, but data transfers between a primary storage system and a third-party secondary storage system may not leverage such native deduplication or compression of the primary storage system, thus resulting in inefficient non-deduplicated transfers. For example, even if a secondary storage system stores data in a deduplicated manner, a primary storage system may first need to transfer all data to the secondary storage system before deduplication is performed. Moreover, adding a third-party backup solution may increase management overhead, complexity, and cost to the computing environment.

Accordingly, it may be useful to provide a data protection solution that seamlessly integrates a primary storage system with an air gapped secondary storage system in a manner that can leverage data efficiencies of the primary storage system such as deduplication and compression while also leveraging lower cost secondary storage and minimizing additional overhead, complexity, and cost. Moreover, it may be useful for such a data protection solution to integrate without necessitating architectural changes to the primary storage system or the secondary storage system.

Examples described herein may relate to a primary storage system that backs up a file system instance to a secondary storage system. The primary storage system may manage data in file system instances that hierarchically relate data objects by content-based signatures to a root object (e.g., in the form of a Merkle tree). The file system instance may have subtrees, each of which correspond to respective inodes of a consumable file system for example. The secondary storage system utilizes a different architecture and stores unstructured data in items and stores items in a data store. To back up data, the primary storage system stores data and metadata of each subtree into a correspondingly designated item of the secondary storage system. Moreover, the primary storage system may initially send a list of the natively maintained content-based signatures to the secondary storage system to determine what data already exists within the deduplication domain of the data store, and in response, the primary storage system sends just the data objects that do not already exist in the secondary storage system data store.

To restore data, a primary storage system creates a new file system instance and restores data and metadata to new subtrees from corresponding items of the secondary storage system. The primary storage system can rebuild the file system instance from the restored data and metadata. Moreover, the primary storage system calculates signatures of objects within the file system instance and compares certain calculated signatures to corresponding signatures previously backed up to the secondary storage system, in order to verify the integrity of the backup. Additionally, the primary storage system may perform backup or restoration of multiple subtrees in parallel, due to each subtree and corresponding item being aligned independently of other subtrees and items.

Thus, by virtue of leveraging native signatures of a file system instance for deduplicating the sent data and leveraging alignment between existing data structures of primary and secondary storage systems (i.e., subtrees and items, respectively) for parallel operation, fast backup and restore times may be achieved, thus improving Recovery Point Objective (RPO) and Recovery Time Objective (RTO) metrics. Moreover, network utilization may be reduced by leveraging the native signatures for deduplicating sent data.

Additionally, a backup may be efficiently verified inline in the course of restoring a backup.

Referring now to the figures, FIG. 1A illustrates an example primary storage system 100 that can back up data to and restore data from a secondary storage system 150. The primary storage system 100 may be a server, a computer appliance, a workstation, a storage system, a converged system, hyperconverged system, or the like. The primary storage system 100 may be referred to as a node and in some instances may be joined with other nodes in a cluster. The primary storage system 100 includes a processing resource 102 that may include a microcontroller, a microprocessor, central processing unit core(s), an application-specific integrated circuit (ASIC), a field programmable gate array (FPGA), etc. The primary storage system 100 includes a machine readable medium 104 that may be non-transitory and include random access memory (RAM), read-only memory (ROM), electrically erasable programmable read-only memory (EEPROM), flash memory, a hard disk drive, etc.

The processing resource 102 may execute instructions 105 (i.e., programming or software code) stored on machine readable medium 104 to perform functions of the primary storage system 100, which may include some or all of the functionality 106, 108, 110, 112, 114, 116, 118 described herein. Additionally or alternatively, the processing resource 102 may include electronic circuitry for performing the functionality 106-118. Functionality 106-112 will be described with reference to FIG. 1A, and functionality 114-118 will be described with reference to FIG. 2A.

In some implementations, the primary storage system 100 may provide a compute environment. For example, a hypervisor may be provided on the primary storage system 100, and the hypervisor may operate virtual machines (VMs) that can run operating systems, applications, etc. (not pictured). Data related to the hypervisor and virtual machines, such as virtual machine disk files (also referred to as VMDK files) may be stored in storage of the primary storage system 100, such as a data virtualization platform 120, which will now be described. Although examples described herein may relate to VM data, it should be understood that the techniques described herein may also support other compute environments, including non-virtualized environments.

The primary storage system 100 may operate a data virtualization platform 120. The data virtualization platform 120 may be created and maintained on the primary storage system 100 by the processing resource 102 executing software instructions stored on the machine readable medium 104. In some implementations, such software instructions may be executed as a virtual machine or virtual controller that in turn creates and maintains the data virtualization platform 120. In some implementations, the instructions executed to operate the data virtualization platform 120 may include instructions responsible for the functionality 106-118 described herein related to data protection and back up and restoration services (e.g., FIGS. 3 and 4).

The data virtualization platform 120 may abstract aspects of physical storage hardware of system 100 on which data is physically stored (e.g., aspects such as addressing, configurations, etc.,) and present virtualized or logical storage to the operating environment of the primary storage system 100 (e.g., hypervisor, virtual machines, operating system, applications, processes, etc.). For example, the operating environment may itself have a consumable file system that presents storage for use or consumption by a hypervisor, an operating system, applications, user data, and other data, and the consumable file system may in turn access storage provided by the underlying data virtualization platform 120. The data virtualization platform 120 may provide data services such as deduplication, compression, replication, and the like, and in manner that is invisible to the consumable file system in some implementations.

In some implementations, the data virtualization platform 120 may be object-based. An object-based data virtualization platform may be different from block level storage (e.g., implemented in storage area networks and presented via a storage protocol such as iSCSI or Fibre Channel) and file level storage (e.g., a virtual file system which manages data in a file hierarchy and is presented via a file level protocol such as NFS or SMB/CIFS), although an object-based data virtualization platform may underlie block or file level storage protocols in some implementations.

In an object-based platform, data may be stored as objects 124. More particularly, an object store 122 stores objects 124, which includes data objects (e.g., 8 kibibytes of data) and metadata objects. User accessible files and directories at the consumable file system level may be made up of multiple data objects in the object store 122. Each object 124 may be identified by a content-based signature (also referred to herein as a signature). For example, the signature of an object 124 may be a cryptographic digest of the content of that object 124, using a hash function such as SHA-1, SHA-256, MD5, etc. The signature can be correlated to a physical address (disk location) of the object's data in an object index.

The data virtualization platform 120 maintains one or more file system instances backed by the object store 122. For example, a file system instance 130 may refer to an organization of metadata objects and data objects stored in the object store 122 that hierarchically relates the data objects by content-based signatures to a root object 132. Thus, a file system instance 130 may be identified by its root object 132. In some implementations, a file system instance may be dedicated to a single virtual machine running on the primary storage system 100, or any other unit of storage in other implementations.

In an example, the file system instance 130 may be a Merkle tree or any other hierarchical arrangement (e.g., directed acyclic graphs, etc.). In the case of a hierarchical Merkle tree, data objects (e.g., 146) may be located at the lowest tree level of any branch (also referred to as the leaf level, which is most distant from the root object) and such data objects may be referred to as leaf data objects. A parent object refers to an object that includes as its content the signatures of child objects. For example, a parent object of leaf data objects is a metadata object that stores as its content the signatures of its child leaf data objects. The root object 132 and other internal objects of the tree may also be metadata objects that store as content the signatures of respective child objects. A metadata object may be able to store a number of signatures that is at least equal to a branching factor of the hierarchical tree, so that it may hold the signatures of all child objects. The data virtualization platform 120 may export a mount point by which a consumable file system or other storage users (e.g., block volumes, network attached storage shares, containers) can access storage maintained in file system instances.

A particular implementation of a data virtualization platform 120 may be described further with reference to the file system instance 130 as illustrated in FIG. 1A. It is noted that for ease of illustration, some branches, levels, and objects of the file system instance 130 have been omitted. The file system instance 130 includes an inode map 134 that is a specialized level of metadata objects, each of which map or correspond to an inode at the consumable file system above the file system instance 130. An inode at the consumable file system may represent a file or a directory, e.g., in a virtual machine dataset. For example, metadata object 135 may map to inode 2 (e.g., root directory in the consumable file system), and metadata object 136 may map to another inode. Thus, an inode number may be implicit in the position of a metadata object in at the inode map 134.

Metadata objects in the inode map 134 and child objects relating therefrom may form respective subtrees. Accordingly, the subtrees of the file system instance 130 may correspond to respective inodes of the consumable file system. For example, metadata object 136 and child objects relating therefrom may form a subtree 138. In an implementation, the metadata object 136 may relate to child objects such as an attribute object 140 (e.g., a data object holding inode attributes from a kernel data structure), an extended attribute object 142, and a subtree data tree root object 144. The subtree data tree root object 144 may be a parent metadata object that hierarchically relates to data objects 146 that make up the file or directory of the consumable file system represented by the inode map metadata object 136.

Depending on the size of the file or directory, more or fewer data objects 146 may store actual data and thus a sparseness of the subtree 138 may vary accordingly. For example, in some implementations, the file system instance 130 and subtrees thereof may represent a sparse file. A sparse file is a file that has less actual data than the logical size of the file. For example, a subtree may represent a file (e.g., a virtual machine disk) having a logical size of 1 terabyte, but the actual data in the file is less than 1 terabyte. In a sparse file, some of the data objects may hold actual data, while other data objects are "holes" that do not hold data. In some implementations, the consumable file system may write to the file in a sequential write pattern or a random access write pattern.

The secondary storage system 150 may belong to a class of storage systems that may be characterized as economical and suitable for long-term archival. For example, the secondary storage system 150 may use less expensive media than a primary storage system. The secondary storage system 150 may back up data from a variety of different sources, including client systems working with primary data. The secondary storage system 150 may operate using a different architecture than the primary storage system 100. In this sense, the secondary storage system 150 may serve as an air gapped system for providing data protection to the primary storage system 100. For example, the primary storage system 100 may store data using a hierarchical arrangement such as a Merkle tree, while the secondary storage system 150 does not.

In some implementations, the secondary storage system 150 may be architected to store blocks of unstructured binary data in items (such as items 154-1, 154-2, 154-N depicted in FIG. 1A), and items may be stored in a data store (such as data store 152). The secondary storage system 150 may hold a plurality of data stores and items, and items within a particular data store may be deduplicated against other items in the same store. For example, when data is streamed from a client system to a data store of the secondary storage system 150 for back up, signatures (e.g., hash signatures) may be generated for chunks of the streamed data by the secondary storage system 150 or an agent thereof executing on the client. The secondary storage system 150 may compare the signatures against a manifest of signatures of data already existing within that store, and the data that do not have matching signatures are sent to the store.

In some examples, a secondary storage system 150 may further connect to and interface with a cloud storage 170, and copy or transfer backup data in one or more stores to the cloud storage 170. Cloud storage 170 may be storage capacity provided by a public cloud or private cloud. Utilizing cloud storage 170 in this manner may allow for additional cost, capacity, performance, and locality benefits for data retention and disaster recovery.

Having described the respective architectures of primary storage system 100 and secondary storage system 150, provide data protection technology that seamlessly integrates with the secondary storage system 150 will now be described. Data is to be backed up from the primary storage system 100 (a backup source) to the secondary storage system 150 (a backup target).

In some implementations, the primary storage system 100 may initially register the secondary storage system 150 as a backup target. During registration, a deduplication domain may be defined to the secondary storage system 150. For example, a deduplication domain may be defined as coextensive with a single node (i.e., a single primary storage system 100), multiple nodes, a cluster of nodes, a federation of clusters, or other arrangements or topologies of primary storage systems. The deduplication domain may also be reconfigured at other times, after the initial registration process. In response. the secondary storage system 150 may create or configure a data store 152 to receive and contain data exclusively from the defined deduplication domain. As described above, the secondary storage system 150 may deduplicate data between items within the same data store 152. A deduplication domain may be defined for various reasons, such as a desire for greater security or data governance (which may benefit from defining a smaller deduplication domain) or a desire for greater storage efficiency (which may benefit from defining a larger deduplication domain).

The primary storage system 100 may include functionality 106 to initiate a back up of a file system instance 130 to the secondary storage system 150. For example, functionality 106 may include initiating a connection and session with the secondary storage system 150. In some implementations, the back up initiation may also indicate to the secondary storage system 150 the deduplication domain of which the file system instance 130 is a member.

After initiation, the primary storage system 100 may proceed to back up the file system instance 130 to the secondary storage system 150 subtree by subtree (and thus inode by inode). In some implementations, the primary storage system 100 may back up multiple subtrees (and thus multiple inodes) in parallel and concurrently, owing to each subtree being efficiently stored into a corresponding independent item or set of items as will be described below.

For each subtree, the primary storage system 100 stores metadata and data of that subtree into one or more items in the data store 152, the items being named according to that subtree. For example, each item may be named with a corresponding inode number of that subtree. The one or more items may also be named with a snapshot ID and an indication of the type of metadata or data stored therein.

In some implementations, the characteristics of a subtree, such as size or type, may determine whether the subtree is stored to a single item or multiple items. For example, a subtree corresponding to an inode that represents a folder in the consumable file system may be stored to a single item (e.g., a metadata only item, such as a base item described below). A subtree corresponding to an inode that represents a file in the consumable file system may be stored to a set of items.

In some implementations, a set of items may include any combination of a base item, a data item, or a secondary storage metadata item. A base item may store tags and metadata that represent the subtree and corresponding inode. A data item may store actual data of the file, such as the data objects 146. In some instances, the number of data items for storing data objects 146 may vary. For example, the number of data items may depend on the amount of actual data in data objects 146, accounting for sparseness for example. Moreover, in some implementations, the data objects 146 may be divided into groups and streamed in parallel to multiple data items in a set. A secondary storage metadata item may store metadata of the secondary storage system 150, including an allocation map that describes how the sparseness of a subtree is translated into data storage in secondary storage system items, for example.

The back up process will now be described in particular with reference to subtree 138, although it should be understood a similar process may be performed for each subtree represented in inode map 134. The primary storage system 100 may include functionality 108 to send a list of content-based signatures of the file system instance 130 to the secondary storage system 150. The list may exclude holes in a sparse file. In some implementations, the primary storage system 100 may walk through the data objects 146 and send the signatures for a subset of the data objects 146 at a time. In particular, the signatures may be the signatures of data objects 146 of the file system instance 130 maintained natively by the data virtualization platform 120. For example, while the secondary storage system 150 may be architected to chunk a backup data stream from a client system for signature calculation as described above, the primary storage system 100 already natively maintains signatures for operation of the data virtualization platform 120. Thus, while backing up subtree 138 for example, the functionality 108 may involve sending a subset of the signatures of data objects 146 that aligns with the chunk size of the secondary storage system 150 backup stream.

In some implementations, backing up the file system instance 130 may be incremental over a backup of a previous version of the file system instance 130 (e.g., snapshots at different times). In such a case, the primary storage system 100 may generate a differential map indicating which of the data objects 146 have changed (i.e., new or modified) over the previous version. The differential map may then be used to filter the signatures to be sent to the secondary storage system 150 to those of data objects that are changed.

The secondary storage system 150 may determine which signatures of the data objects 146 of the subtree 138 do not exist in a signature manifest representing data stored in items in the data store 152. The primary storage system 100 includes functionality 110 that stores data objects for which signatures do not exist in the manifest into an item 154-2 (or into a data item in a set of items 154-2) in the data store 152 of the secondary storage system 150. That is, data objects for which signatures do not exist in the manifest are copied into an item 154-2. The data objects stored into the item 154-2 also may be limited to changed data objects according to the differential map. Item(s) 154-2 may be named in accordance with subtree 138 (e.g., with an inode number and/or other identifying information). The secondary storage system 150 may then update the manifest with the signatures of data newly added to the data store 152. Accordingly, existing signatures maintained by the primary storage system 100 may be reused to yield improved efficiencies in the backup process, including decreased network utilization by not sending duplicate data, while complying with chunk size boundaries of the secondary storage platform 150 architecture.

Figure 1B:
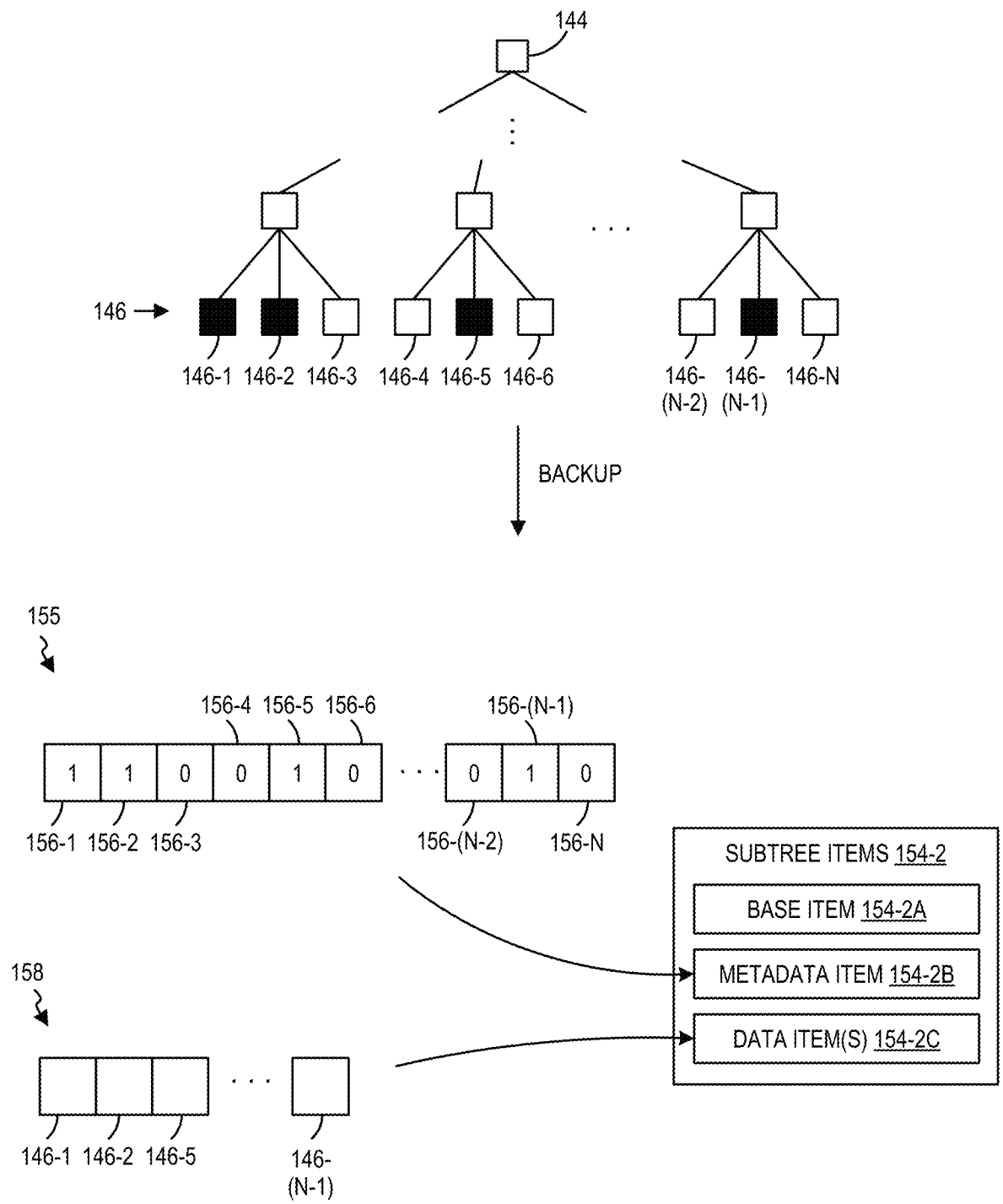
FIG. 1B depicts an example allocation map.

In some implementations, the primary storage system 100 may build an allocation map describing the sparseness of the data objects 146 of the subtree 138 concurrently with functionality 108 or 110 and store the allocation map into the item 154-2 (or a secondary storage metadata item in a set of items 154-2). FIG. 1B illustrates an example of functionality 110 building an allocation map 156 while backing up the data objects 146 of subtree 138. For the sake of illustration, it is assumed that the store 152 of the secondary storage system 150 does not already hold any of the data objects 146. Moreover, FIG. 1B depicts the subtree data tree stemming from object 144 in greater detail than in FIG. 1A, but also may be understood to omit branches, levels, and objects for ease of illustration. In the example of FIG. 1B, the data objects 146 can have N-number objects representing a sparse file, with data objects 146-1, 146-2, 146-5, 146-(N−1) depicted as solid filled rectangles holding actual data (e.g., 8 kibibytes of data each), while other data objects 146-3, 146-4, 146-6, 146-(N−2), and 146-N depicted as outlined unfilled rectangles are not actual data. Instead, associated parent metadata objects may hold a pre-defined hole value instead of an addressable content-based signature for those holes.

Under functionality 110, the primary storage system 100 may walk through data objects 146 directionally (e.g., incrementing offset locations from 146-1 to 146-N) and also simultaneously walk through an allocation map 155. In an implementation, the allocation map 155 may be a bitmap, although alternatives may be utilized. Each bit in the allocation map 155 may be set for each corresponding data object 146 that stores actual data. For example, bits 156-1, 156-2, 156-5, and 156-(N−1) are set in correspondence to data objects 146-1, 146-2, 146-5, 146-(N−1). Other bits in allocation map 155 are cleared in correspondence to holes in the leaf level. The allocation map 155 may be stored to the metadata item 154-2B in the set of items 154-2 in the secondary storage system 150. The data 146-1, 146-2, 146-5 through 146-(N−1) may be sent together without holes as a stream 158 to the data item(s) 154-2C in the set of items 154-2 in the secondary storage system 150.

Referring again to FIG. 1A, functionality 110 also includes storing into the item 154-2 (or into the base item 154-2A in a set of items 154-2) the metadata of the subtree 138. The stored metadata may include a subtree root signature that is the content-based signature of the subtree data tree root object 144. In some implementations, metadata child objects between the subtree data tree root object 144 and the data objects 146 are not stored into the secondary storage system 150. In some implementations, objects in the node map 134 are not stored into the secondary storage system 150.

In some implementations, the metadata stored into item 154-2 (or into the base item 154-2A in a set of items 154-2) may also include the attribute object 140, the extended attribute object 142, a signature of the attribute object 140, and/or a signature of the extended attribute object 142. In some implementations, the stored metadata may also include an indication of the total number of items (e.g., in a set of items 154-2) representing the subtree 138, or other information describing the subtree 138.

Functionality 108 and 110 may be carried out to back up each subtree represented in the inode map 134 into one or more correspondingly named item(s) in the data store 152, in a manner similar to that described above for subtree 138. For example, a subtree (not pictured) related to metadata object 135, which corresponds to a root inode of the consumable file system, may be stored into a root inode subtree item 154-1 (or set of items 154-1). In a file system instance 130 with N-number of inodes represented in the inode map 134, the Nth subtree may be stored into an item 154-N (or set of items 154-N).

The primary storage system 100 also includes functionality 112 to store file system instance configuration data into a special subtree item. For example, because a root inode corresponding to a root directory may be assumed to exist in a consumable file system, the file system instance configuration data may be stored into the root inode subtree item(s) 154-1 in an implementation. The file system instance configuration data may include information relevant to the entire file system instance, such as an identifier, a name, a timestamp, or other information. For example, in implementations where the file system instance 130 represents a virtual machine, the configuration data may include a VM UUID (universally unique identifier), a snapshot identifier, a snapshot timestamp, etc. The file system instance configuration data may also include an indication of the number of subtrees (i.e., number of inodes) and/or a list of inode numbers associated with the file system instance 130. The file system instance configuration data may be useful for restoring the backup of the file system instance 130 in a manner described below with respect to FIG. 2A. In some implementations, an indication of the state of the backup may also be included, such as an in-progress indication, a backup complete indication, a backup aborted indication, or other indications, which may be useful for further handing of the backup.

Once the primary storage system 100 has completed functionality 108, 110, 112 to copy data and metadata of each subtree in the file system instance 130 and file system instance configuration data into items 154-1 through 154-N, those items 154-1 through 154-N may be deemed a complete backup of the file system instance 130 at a particular point in time. Additional backups may be made of the file system instance 130 at subsequent points in time to new sets of items in the data store 152 by executing functionality 106, 108, 110, 112, again. Additional backups may continue to leverage the manifest of data store 152, which reflects data stored for previous backups, for deduplication and storage efficiency.

In some implementations, the secondary storage system 150 may be instructed, by the primary storage system 100 or a user, to copy or transfer backup data to the cloud storage 170. For example, the secondary storage system 150 may copy or transfer items 154-1 through 154-N to the cloud storage 170.

A backup of the file system instance 130 may be restored to a primary storage system from the secondary storage system 150 or from cloud storage 170 for various reasons, e.g., as part of a disaster recovery plan after failure of the primary storage system 100. A backup of the file system instance 130 on the secondary storage system 150 or cloud storage 170 may be restored to the primary storage system 100 or a different primary storage system 160. In other words, the restoration target for the backup (i.e., the system to which the backup is to be restored) need not be the same primary storage system 100 from which the backup was created. In some examples, the restoration target may have the same architecture as the primary storage system 100 from which the backup was created.

Figure 2A:
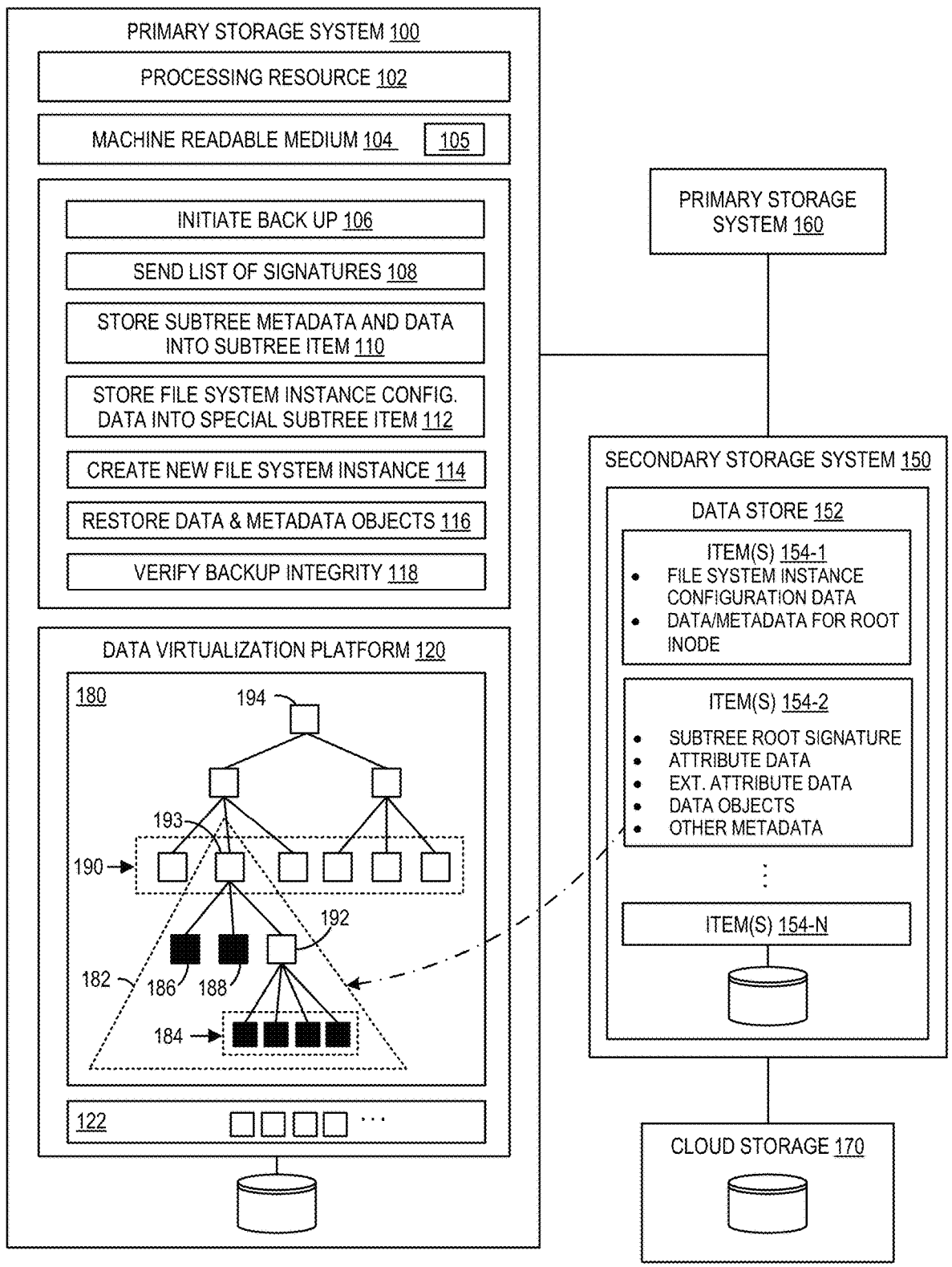
FIG. 2A depicts an example system to restore data from a secondary storage system.

Turning to FIG. 2A, example backup restoration functionality will now be described as being coordinated between the secondary storage system 150 and the primary storage system 100 as the restoration target. In other implementations the backup may be restored from the cloud storage 170 in a similar manner and/or may be restored to a different primary storage system such as the primary storage system 160, in which case the primary storage system 160 may be understood to include the functionality 114, 116, 118 described below.

The primary storage system 100 may include functionality 114 to create a new file system instance 180, which may be a hierarchical structure such as a Merkle tree similar to file system instance 130. In some implementations, the size of the file system instance 180 in terms of branching factor, number of levels, etc., may be predefined by the common architecture of the restoration target and the backup source.

In some implementations, the primary storage system 100 may retrieve the file system instance configuration data of the file system instance 130 stored to a special subtree item, such as the root inode subtree item(s) 154-1 (e.g., stored by functionality 112). The file system instance configuration data may be used to create the file system instance 180, including configuring the size of the file system instance 180, naming the file system instance 180, and/or populating various configuration data of the file system instance 180 used by the data virtualization platform 120.

The primary storage system 100 may include functionality 116 to restore data and metadata objects from the secondary storage system 150 to the new file system instance 180. Under functionality 116, the primary storage system 100 may copy data objects from the items 154-1 through 154-N into the object store 122, particularly if a data object does not already exist in the object store 122. In some implementations, the secondary storage system 150 may send (or the primary storage system 100 may retrieve) signatures for data objects in the backup items 154-1 through 154-N, and the primary storage system 100 may determine if the data object already exists in the object store 122. The primary storage system 100 may request just data objects that do not already exist in the object store 122, thus reducing network utilization. The data objects may be placed into new subtrees of the new file system instance 180 corresponding to the item 154-1 through 154-N from which the data objects were copied.

In some implementations, the primary storage system 100 may identify which subtree data is to be copied into by the name of the item. For example, item(s) 154-2 may be named for the inode associated with subtree 138 of FIG. 1A, and under functionality 116 the primary storage system 100 may copy data objects from item 154-2 (or a data item in a set of items 154-2) into subtree 182 at the same position in inode map 190 as the subtree 138 in the inode map 134. In some implementations, the primary storage system 100 may read an allocation map from the item 154-2 (or a secondary storage metadata item in a set of items 154-2) to determine the sparseness of the subtree 182, and more particularly, the sparseness of the leaf level of the subtree 182. The sparseness information may assist the primary storage system 100 to place the data objects 184 from the item 154-2 into a correct position at the leaf level. Data objects 184 may be placed into the subtree 182 by calculating their content-based signatures and storing those signatures into parent metadata objects (not shown) of the subtree 182 aligned to leaf level positions of the data objects 184 based on the allocation map.

Figure 2B:
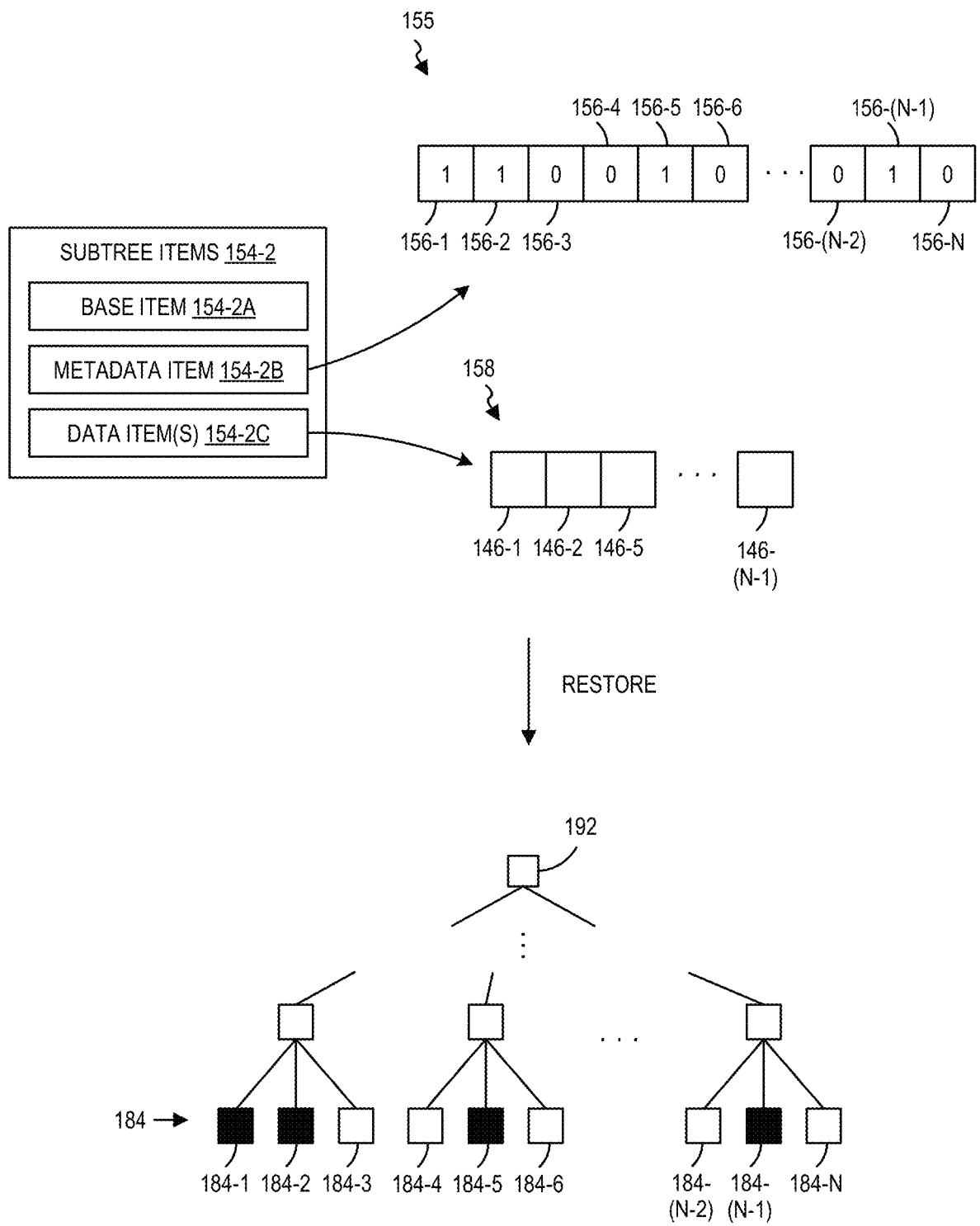
FIG. 2B depicts restoring data using an allocation map.

FIG. 2B illustrates an example of functionality 110 restoring data objects 158 from data item(s) 154-2C using an allocation map 155 previously created (e.g., as described with reference to FIG. 1B) and retrieved from metadata item 154-2B. The primary storage system 100 may walk directionally through the allocation map 155 and through the offset locations of the leaf level of the new subtree data tree stemming from object 192 simultaneously. For a set bit in the allocation map 155, the primary storage system 100 may place a data object from the data stream 158 into the offset location in the subtree data tree and then move to the next data object in the data stream 158. For a cleared bit in the allocation map 155, the primary storage system 100 may skip to the bit in the allocation map 155 and the next offset location in the leaf level without placing data from the data stream 158 and without moving to the next data object in the data stream 158. For a cleared bit, the primary storage system 100 may place a predefined hole value into the metadata parent object in association with that offset location. By repeating the foregoing process through the allocation map 155, data objects 146-1, 146-2, 146-5, through 146-(N–1) from the data item(s) 154-2C are restored to data objects 184-1, 184-2, 184-5, through 184-(N–1) in the proper locations in the new subtree 182, while creating holes in the proper locations. Accordingly, the data tree of new subtree 182 may be restored identically to the data tree of subtree 138.

Referring again to FIG. 2A, under functionality 116, the primary storage system 100 may also copy the attribute object and the extended attribute object from the item 154-2 (or the base item in a set of items 154-2) into the object store 122, if not already existing in the object store 122. The copied attribute and extended attribute objects can then be placed into the file system instance 180 as attribute object 186 and extended attribute object 188 respectively by adding their content-based signatures to their associated parent metadata object 193.

Functionality 116 may be repeated for each item 154-1 through 154-N comprising the backup, as indicated in the number of subtrees/inodes or list of inode numbers information in the special item (e.g., root inode subtree item(s) 154-1). In this manner, all data objects at the leaf level of the new file system instance 180, as well as attribute and extended attribute objects for each subtree, may be restored to the new file system instance 180. For example, the restored objects 184, 186, 188 in subtree 182 are depicted as solid, filled rectangles.

In some implementations, various metadata objects in the file system instance 180 are not restored from the secondary storage system 150, including e.g., the objects depicted as outlined, unfilled objects (e.g., subtree data tree root object 192, inode map metadata objects 190 and 193, root object 194). In such implementations, the data virtualization platform 120 may rebuild the metadata objects of the file system instance 180 not restored from the secondary storage system 150. For example, for each level starting from the leaf data objects (e.g., 184), signatures are calculated for objects at that level and stored into a parent metadata object at the next level higher. The process is repeated upward until a root signature is calculated for the root object 194. By virtue of the foregoing rebuilding process, new subtree root signatures are also calculated for the subtree data tree root object (e.g., 192) of each subtree.

The primary storage system 100 may include functionality 118 to verify integrity of the backup (i.e., the items 154-1 through 154-N) and to verify that the restoration process was successful. To verify backup integrity is to check that the backup has not been corrupted or modified since its creation. Under functionality 118, the primary storage system 100 may retrieve a subtree root signature from the item 154-2 (or the base item in a set of items 154-2), which is the signature of subtree data tree root object 144 of the original file system instance 130, and compare that retrieved subtree root signature to the new subtree root signature calculated for subtree data tree root object 192 of new file system instance 180. If the subtree root signatures match, then that subtree is deemed to be verified. If the subtree root signatures do not match, then an error may be returned. The foregoing verification process may be performed for all subtrees in the inode map 190 or for all subtree root signatures in items in a backup. In an implementation, the backup and the restoration process may be deemed verified if all new subtree root signatures of the file system instance 180 match the subtree root signatures stored in the items 154-1 through 154-N.

In some implementations, the primary storage system 100 may perform functionality 116 to restore multiple inodes in parallel, owing to each subtree being stored in an independently named item or set of items. For example, the primary storage system 100 may concurrently copy data objects from items 154-2 and 154-N into respective new subtrees of the file system instance 190. In some implementations, the primary storage system 100 may also perform functionality 118 to verify multiple subtrees in parallel. Accordingly, by virtue of the primary storage system 100 being capable of backing up (by instructions 108-112) and restoring (by instructions 114-118) multiple inode subtrees in parallel, improved backup and restore times, thus improving RPO and RTO metrics.

Figure 3:
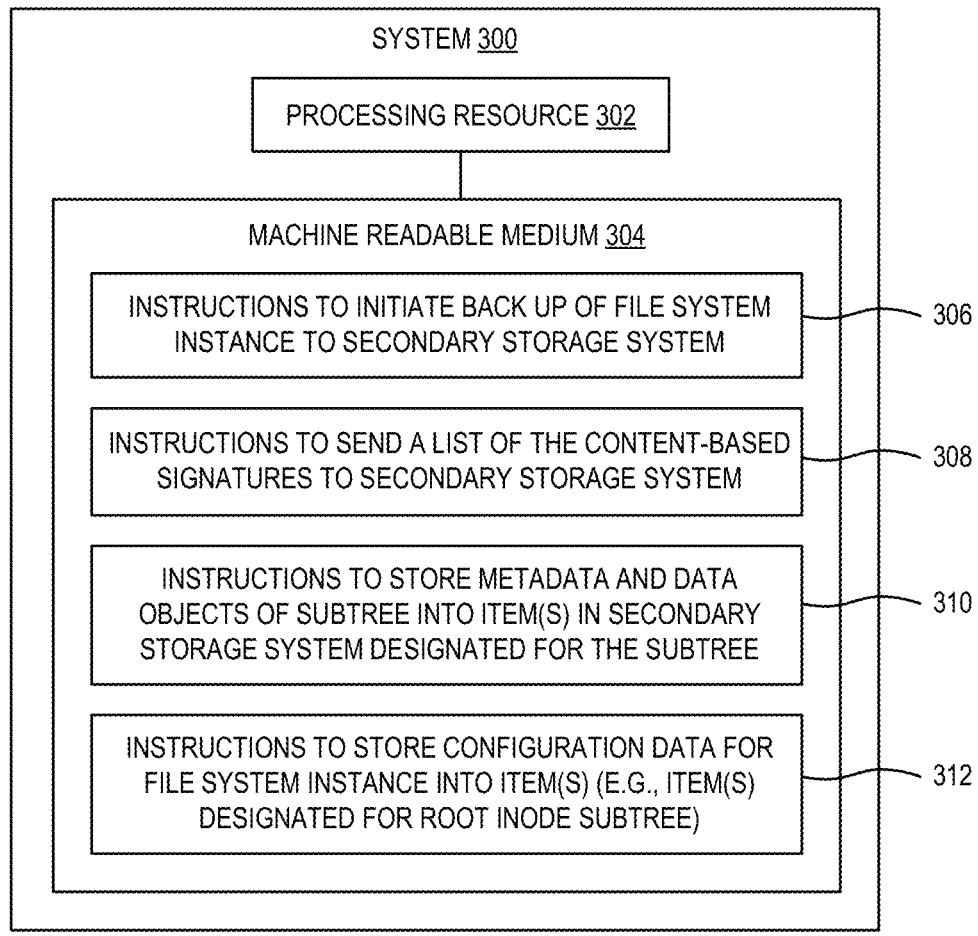
FIG. 3 depicts an example system with a machine readable medium that includes instructions to back up a data to a secondary storage system.

FIG. 3 depicts an example system 300 that includes a non-transitory, machine readable medium 304 encoded with example instructions 306, 308, 310, 312 executable by a processing resource 302. In some implementations, the system 300 may serve as or form part of the primary storage system 100. The processing resource 302 may include a microcontroller, a microprocessor, central processing unit core(s), an ASIC, an FPGA, and/or other hardware device suitable for retrieval and/or execution of instructions from the machine readable medium 304 to perform functions related to various examples. Additionally or alternatively, the processing resource 302 may include or be coupled to electronic circuitry or dedicated logic for performing some or all of the functionality of the instructions described herein.

The machine readable medium 304 may be any medium suitable for storing executable instructions, such as RAM, ROM, EEPROM, flash memory, a hard disk drive, an optical disc, or the like. In some example implementations, the machine readable medium 304 may be a tangible, non-transitory medium. The machine readable medium 304 may be disposed within the system 300, in which case the executable instructions may be deemed installed or embedded on the system 300. Alternatively, the machine readable medium 304 may be a portable (e.g., external) storage medium, and may be part of an installation package. As described further herein below, the machine readable medium 304 may be encoded with a set of executable instructions 306, 308, 310, 312. It should be understood that part or all of the executable instructions and/or electronic circuits included within one box may, in alternate implementations, be included in a different box shown in the figures or in a different box not shown. Some implementations of the system 300 may include more or fewer instructions than are shown in FIG. 3. In some implementations, one or more of the instructions 306, 308, 310, 312 may implement or incorporate aspects of functionality 106, 108, 110, 112 described above to back up a data of system 300.

Instructions 306, when executed, cause the processing resource 302 to initiate a backup of a file system instance to a secondary storage system. The file system instance is one that hierarchically relates data objects by content-based signatures to a root object. The file system instance includes subtrees that correspond to respective inodes, where the inodes may belong to a consumable file system that is backed by the file system instance. Instructions 306 may include, for example, instructions to open a session with the secondary storage system.

Instructions 308, when executed, cause the processing resource 302 to send a list of content-based signatures to the secondary storage system. The content-based signatures may be the signatures of data objects generated natively by the system 300 as part of maintaining the file system instance. Instructions 308 may be performed for one subtree or part of one subtree at a time.

Instructions 310, when executed, cause the processing resource 302 to store metadata and data of a subtree of the file system instance into one or more items in the secondary storage system designated for that subtree (e.g., designated by name). For example, a single item may be used to store any data and metadata of the subtree, or multiple items such as a base item, a data item, and/or other items may be used to contain and separately organize data and metadata of the subtree. Metadata of a subtree may include a subtree root signature (i.e., signature of a subtree data tree object), attribute data (and/or a signature thereof), extended attribute data (and/or a signature thereof), an indication of the total number of items representing the subtree, and other information describing the subtree. Data of the subtree may include one or more data objects of the subtree. In particular, instructions 310 may send data objects to the secondary storage system based on a determination by the secondary storage system of which signatures (from the list sent by instructions 308) of data objects of the subtree do not exist in a manifest of the secondary storage system. Thus, instructions 310 sends non-duplicative data objects that do not already exist in the secondary storage system, based on the manifest.

Instructions 312, when executed, cause the processing resource 302 to store configuration data for the file system instance itself into at least one item in the secondary storage system. For example, the item may be a special item. In an implementation, the item may be an item designated for a subtree corresponding to a root inode, due to a strong likelihood that the root inode exists and a backup item therefore exists for storing the configuration data. The configuration data may include information relevant to the entire file system instance, such as an identifier, a name, a timestamp, an indication of the number of subtrees (i.e., number of inodes), a list of inode numbers, or other information. Instructions 310 and 312 may be executed during the backup process initiated by instructions 306.

In some implementations, the machine readable medium 304 may also store other instructions useful for backing up a file system instance. For example, medium 304 may store instructions that, when executed, cause the processing resource 302 to define a backup deduplication domain to the secondary storage system. In response, the secondary storage system configures a data store to exclusively contain items that store metadata and data object backups from the backup deduplication domain. The manifest described above with reference to instructions 310 may be dedicated to the data store or a section of the manifest may be dedicated to the data store.

In some implementations, the machine readable medium 304 may store instructions that, when executed, cause the processing resource 302 to coordinate the naming of an item according to an inode corresponding to the subtree being stored into that item. In some implementations, the machine readable medium 304 may store instructions that, when executed, cause the processing resource 302 to request the secondary storage system to store the items to cloud storage.

Figure 4:
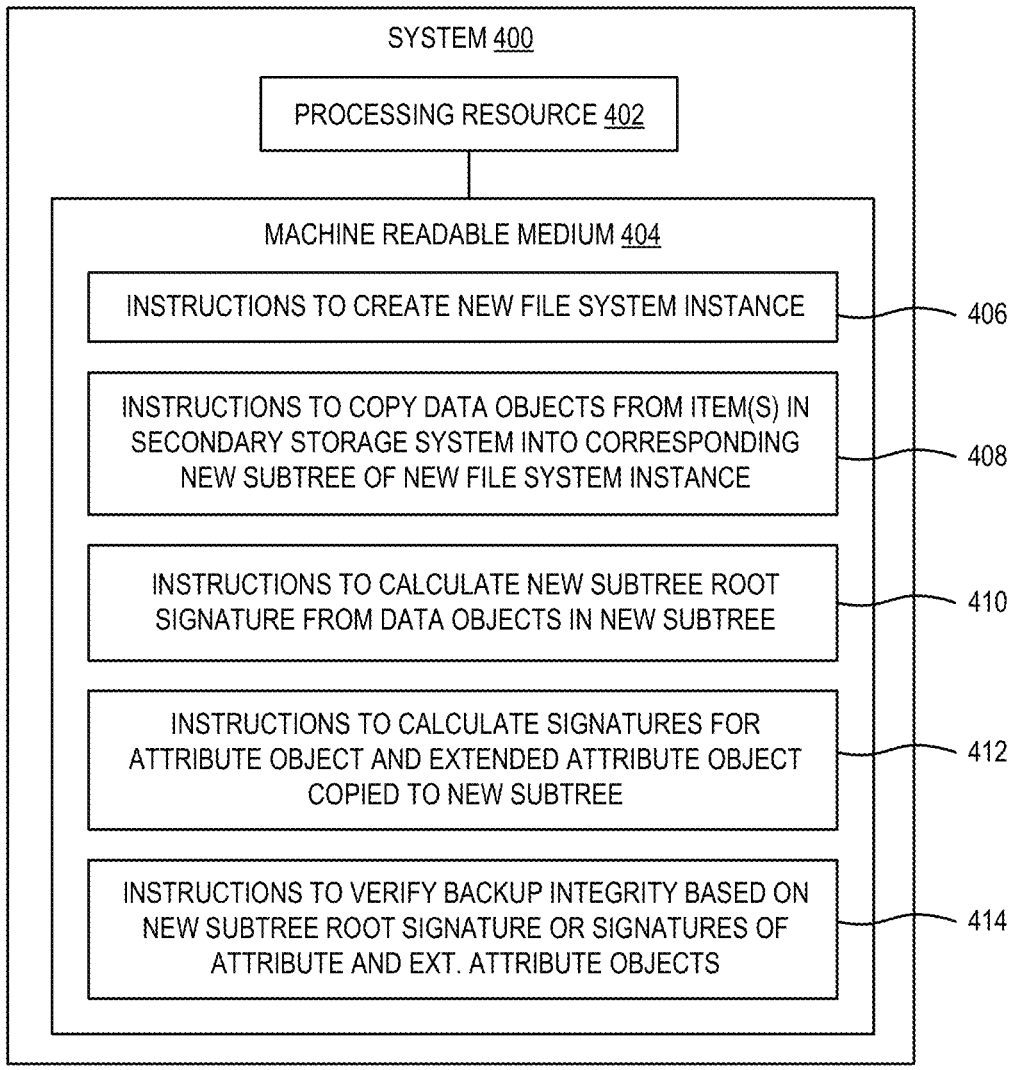
FIG. 4 depicts an example system with a machine readable medium that includes instructions for backup restoration.

FIG. 4 depicts an example system 400 that includes a processing resource 402 coupled to a non-transitory, machine readable medium 404 encoded with example instructions. The processing resource 402 and the machine readable medium 404 may be analogous in many respects to the processing resource 302 and the machine readable medium 304, respectively. In some implementations, the system 400 may serve as or form part of the primary storage system 100 or 160.

The machine readable medium 404 may be encoded with a set of executable instructions 406, 408, 410, 412, 414. It should be understood that part or all of the executable instructions and/or electronic circuits included within one box may, in alternate implementations, be included in a different box shown in the figures or in a different box not shown. Some implementations of the system 400 may include more or fewer instructions than are shown in FIG. 4. In some implementations, one or more of the instructions 406, 408, 410, 412, 414 may operate in conjunction or in combination with one or more of the instructions 306, 308, 310, 312 above. In some implementations, one or more of the instructions 406, 408, 410, 412, 414 may implement or incorporate aspects of functionality 114, 116, 118 described above related to backup restoration from a secondary storage system to system 400. The system 400 may or may not be the same system from which the data was backed up to the secondary storage system.

Instructions 406, when executed, cause the processing resource 402 to create a new file system instance on the system 400. Instructions 408, when executed, cause the processing resource 402 to copy data objects from an item in the secondary storage system into a corresponding new subtree of the new file system instance. For example, data objects may be stored in an item or a data item of a set of items, and the name of that item may indicate which subtree to restore the data objects to (e.g., by being named for an inode or the like). Instructions 408 may utilize an allocation map stored at the secondary storage system to determine where the data objects are to be placed within the subtree. In some implementations, instructions 408 may also copy other data or metadata such as attribute objects and extended attribute objects from an item in the secondary storage system into the corresponding new subtree of the new file system instance.

Instructions 408 may be performed for each independently named item or set of items (and at least one item or set of items) so as to restore all subtrees of the backup to the new file system instance. In some implementations, the machine readable medium 304 may store instructions that cause the processing resource 302 to manage concurrent execution of instructions 408 to restore multiple subtrees concurrently and in parallel.

Instructions 410, when executed, cause the processing resource 402 to calculate a new subtree root signature from data objects copied into the new subtree (by execution of instructions 408). In particular, such a calculation may involve calculating signatures for objects at a given level (starting with data objects at the leaf level), storing the signatures into a parent metadata object at the next level higher, and repeating the foregoing process for each successively higher level until the subtree data tree root object is reached. Instructions 412, when executed, cause the processing resource 402 to calculate signatures of an attribute object and an extended attribute object copied to the new subtree (by execution of instructions 408).

Instructions 414, when executed, cause the processing resource 402 to verify backup integrity (i.e., confirm that the backup has not been corrupted). Instructions 414 may verify backup integrity by determining that the new subtree root signature calculated via instructions 410 matches a subtree root signature included in the metadata stored into an item of the secondary storage system. Additionally or alternatively, instructions 414 may verify backup integrity by determining that the signatures of the attribute object and the extended attribute object copied to the new subtree (i.e., signatures calculated via instructions 412) match signatures included in metadata stored into an item of the secondary storage system. If a newly calculated signature does not match the reference signature in the secondary storage system, then instructions 414 may cause the processing resource 402 to report the error or perform other error handling action.

Figure 5:
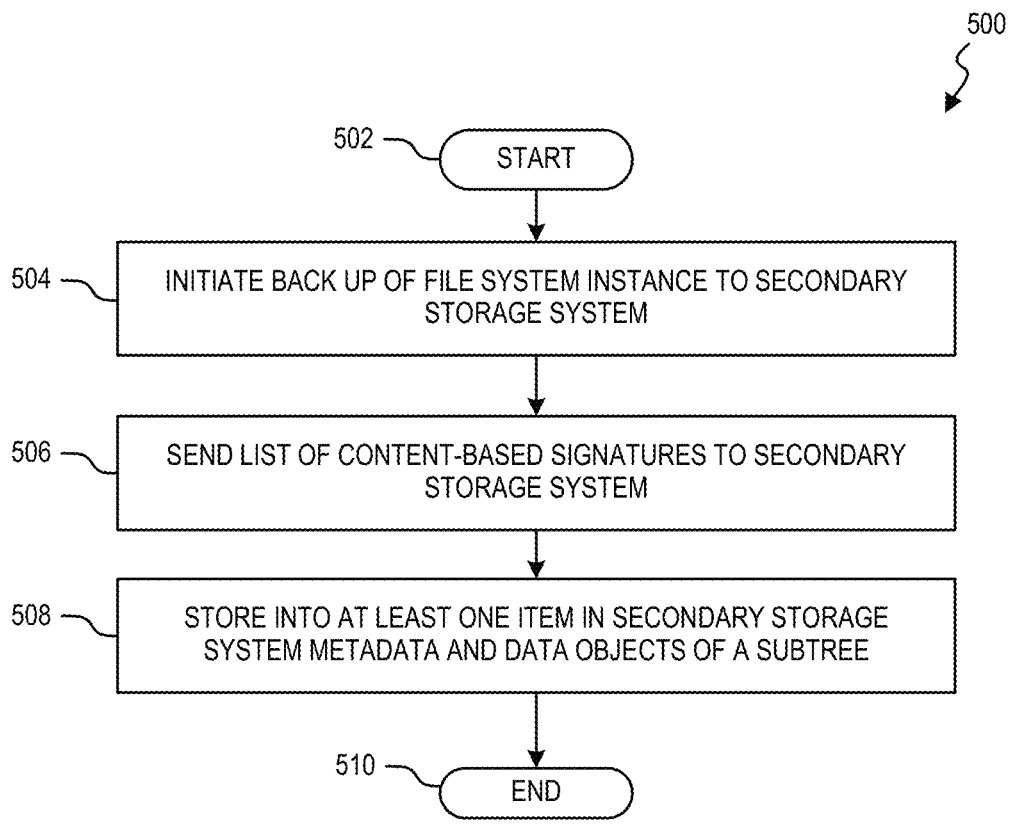
FIG. 5 depicts an example method for backing up data to a secondary storage system.
Figure 6:
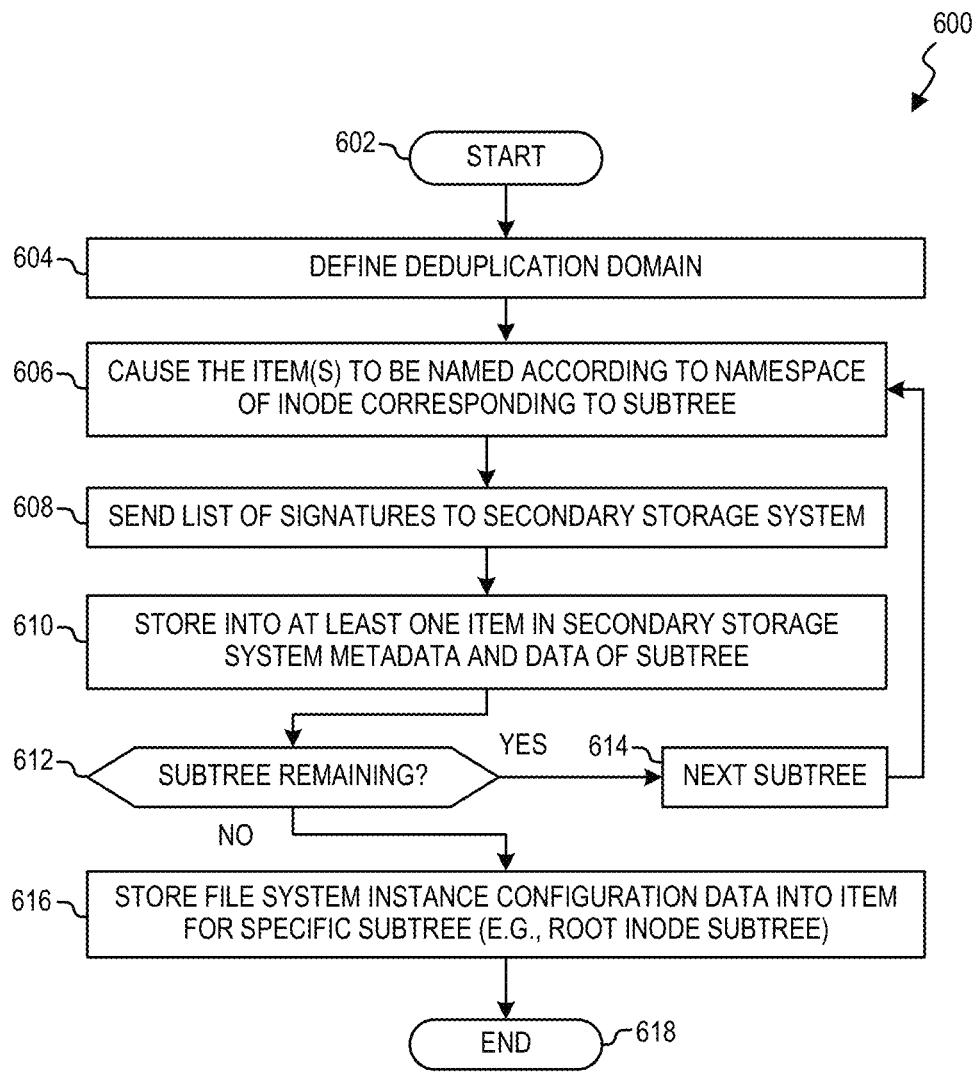
FIG. 6 depicts another example method for backing up data to a secondary storage system.
Figure 7:
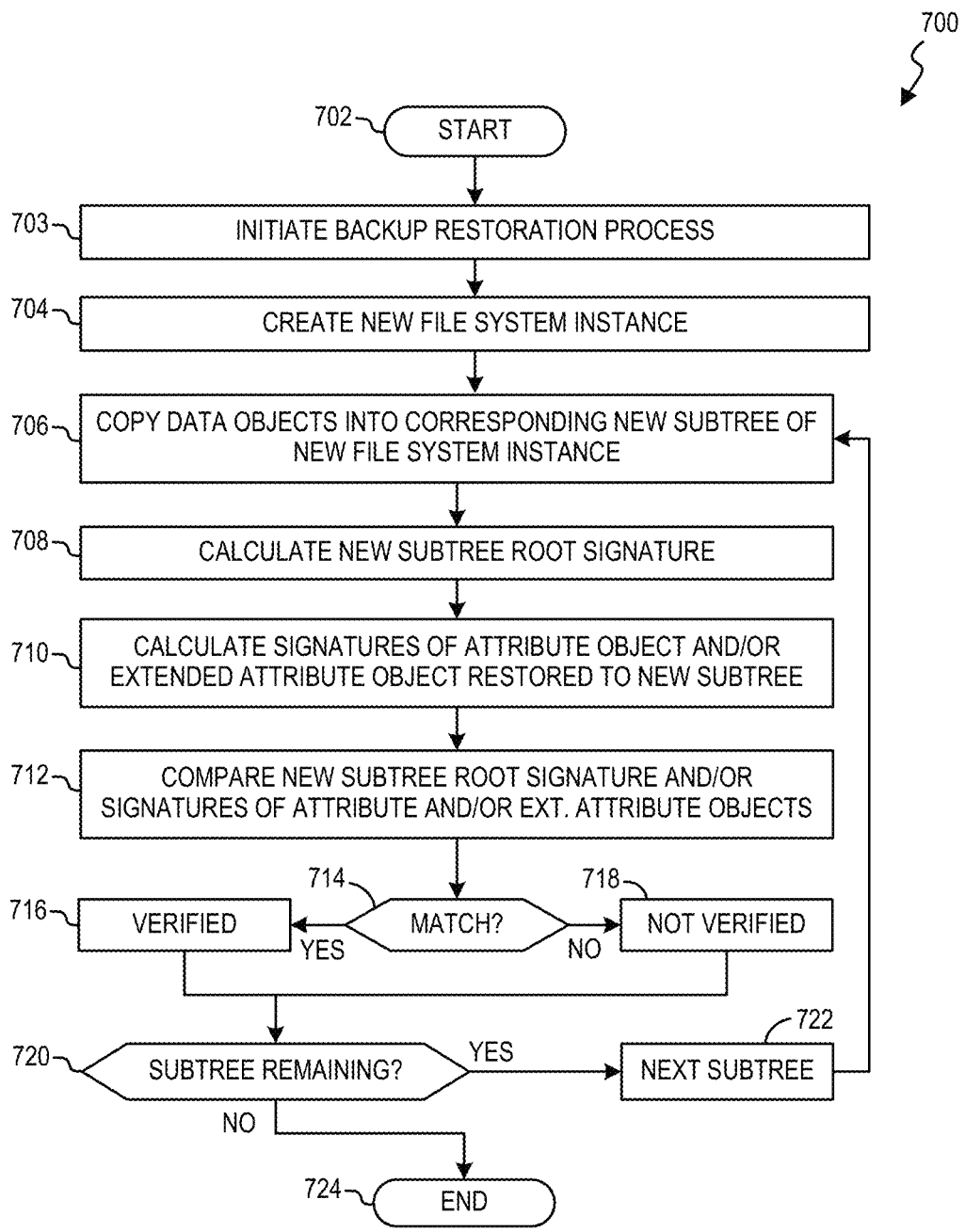
FIG. 7 depicts an example method of a backup restoration process.

FIGS. 5, 6, and 7 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods shown in FIGS. 5, 6, and 7 may be implemented in the form of executable instructions stored on a machine readable medium (e.g., such as machine readable medium 304, 404) and executed by a processing resource (e.g., such as processing resource 302, 402) and/or in the form of electronic circuitry. For example, aspects of the methods may be described below as being performed by a primary storage system, such as primary storage system 100. In some implementations, the methods may be performed by a virtual controller of a primary storage system 100.

FIG. 5 is a flow diagram depicting an example method 500. Method 500 starts at block 502 and continues to block 504, where a primary storage system initiates a backup of a file system instance of the primary storage system to a secondary storage system. The primary storage system and the secondary storage system use different storage architectures. As described above, the primary storage system stores data as data objects in an object store and maintains a file system instance hierarchically that relates data objects by content-based signatures to a root object (e.g., as a Merkle tree). The file system instance includes subtrees that correspond to respective inodes of a consumable file system at a layer above the file system instance.

At block 506, the primary storage system sends a list of content-based signatures of the data objects of the file system instance to the secondary storage system. The content-based signatures are generated and maintained by the primary storage system natively, as part of the operation of the primary storage system.

At block 508, the primary storage system stores metadata and data of a subtree of the file system instance into at least one item in the secondary storage system. The item in the secondary storage system is associated with the subtree, e.g., by way of being named according to the inode associated with the subtree or another identifier associated with the subtree. The metadata stored into the item represents the inode corresponding to the subtree, and may include a subtree root signature (i.e., signature of the subtree data tree root object), inode attributes (e.g., stored in an attribute object), inode extended attributes (e.g., stored in an extended attribute object), and a total number of secondary storage system items representing the inode. The data stored into the item may include data objects of the subtree. In particular, the data objects may be those for which signatures sent in the list at block 506 do not exist in a manifest of the secondary storage system. The secondary storage system may make the determination of whether the signature exists, based on a comparison of the list sent at block 506 and the manifest. Thus, the primary storage system may avoid sending data that may already exist in the secondary storage system. Method 500 ends at block 510.

FIG. 6 is a flow diagram depicting an example method 600, which may be useful for backing up a primary storage system to a secondary storage system. Method 600 starts at block 602 and continues to block 604, where a backup deduplication domain is defined (i.e., communicated) to the secondary storage system. Block 604 may result in the secondary storage system creating or configuring a data store to exclusively contain items to store metadata and data object backups from the backup deduplication domain (e.g., which may include the primary storage system and other systems in the same cluster or federation).

Method 600 proceeds to back up each subtree of a plurality of subtrees of a file system instance of the primary storage system via e.g., blocks 606, 608, 610. In some implementations, multiple subtrees (e.g., more than one) may be backed up in parallel, such that multiple sequences of blocks 606, 608, 610 may be performed concurrently for different subtrees.

At block 606, the primary storage system may cause an item or a set of items (e.g., a base item, a data item, and/or a secondary storage metadata item) at the secondary storage system to be named according to an inode corresponding to the subtree being backed up.

At block 608, the primary storage system sends a list of the content-based signatures of data objects of the subtree being backed up to the secondary storage system. In some implementations, block 608 may include sending the list a portion at a time. The secondary storage system may make a determination of which signatures of the sent list do not exist in a manifest of the secondary storage system. The manifest may relate to the deduplication domain configured by block 604.

At block 610, the primary storage system stores data and metadata of the subtree into one or more items of the secondary storage system named by block 606 for the subtree being backed up. In some implementations, metadata may be stored in to a base item, where the metadata may include a subtree root signature, inode attribute data from the subtree, inode extended attribute data from the subtree, and/or the number of items representing the subtree. Data may be stored into a data item, and the data may include solely the data objects for which the secondary storage system has determined that signatures do not exist in the manifest.

At block 612, the primary storage system determines whether any subtrees of the file system instance have not been backed up. If there is at least one subtree remaining to be backed up ("YES" at block 612), method 600 proceeds to block 614 where the primary storage system selects the next subtree to back up via blocks 606, 608, 610. If no subtrees remain to be backed up ("NO" at block 612), method 600 may proceed to block 616.

At block 616, the primary storage system may store file system instance configuration data into an item in the secondary storage system associated with a specific subtree. File system instance configuration data may include information relevant to the entire file system instance, such as an identifier, a name, a timestamp, or other information. Block 616 may also include storing information about the respective inodes (e.g., a quantity of the inodes, a list of inode numbers, etc.) into the specific subtree. In some implementations, the specific subtree may be a subtree corresponding to a root inode, because the root inode generally may be assumed to exist in a consumable file system, and thus the subtree is a convenient place to store the file system instance configuration data. Method 600 may end at block 618.

FIG. 7 is a flow diagram depicting an example method 700, which may be useful for restoring data from a secondary storage system to a primary storage system. Method 700 starts at block 702 and continues to block 703 where a primary storage system initiates a backup restoration process with a secondary storage system. The primary storage system participating in the restoration process may be different than the system from which the backup was created.

Initiating the backup restoration may include communicating to the secondary storage system an identifier of a backup to be restored. The primary storage system may access file system instance configuration data (e.g., retrieved from a root inode subtree item) to determine how many inodes are in the backup and what the inode numbers are.

At block 704, the primary storage system creates a new file system instance, based on the file system instance configuration data in some implementations. Method 700 then proceeds to restore each subtree of a plurality of subtrees of the newly created file system instance via e.g., blocks 706-722. In some implementations, multiple subtrees (e.g., more than one) may be restored in parallel, such that multiple sequences of blocks 706-722 may be performed concurrently for different subtrees. In some implementations, the primary storage system may restore subtrees in inode order.

For a particular inode and corresponding subtree in the new file system instance, the primary storage system accesses the correspondingly named item or set of items in the secondary storage system (e.g., named by block 606). At block 706, the primary storage system copies data objects from the item(s) named for that inode into the corresponding new subtree of the new file system instance. More particularly, the data objects may be copied to an object store of the primary storage system, and the signatures of those data objects may be added to leaf metadata objects of the new file system instance. In some implementations, block 706 may include utilizing an allocation map stored with the secondary storage system item to determine a sparseness of the new file system instance and which leaf metadata objects to store the data object signatures. At block 706, the primary storage system may also copy attribute and extended attribute data from item(s) in the secondary storage system named for that inode into the corresponding new subtree as an attribute object and an extended attribute object respectively.

At block 708, the primary storage system calculates a new subtree root signature from data objects copied into the new subtree at block 706. Calculating the new subtree root signature may involve calculating signatures for objects at each level of the new subtree (starting at the leaf level for a first iteration), storing those signatures in a parent metadata object, and repeating those calculating and storing processes for each successive level higher until the subtree data tree root object is generated and a signature thereof is calculated. At block 710, the primary storage system may calculate signatures of an attribute object and an extended attribute object restored to the new subtree at block 706.

At blocks 712-718, the primary storage system verifies backup integrity. At block 712, the primary storage system compares the new subtree root signature calculated at block 708 against a subtree root signature retrieved from the corresponding inode-named item (or in some implementations, a base item in a set of items) in the secondary storage system. Alternatively or additionally, block 712 may involve comparing signatures of the attribute object and/or the extended attribute object calculated at block 708 against an attribute object signature and/or an extended attribute object signature retrieved from or derived from the corresponding inode-named item.

If, based on the comparison at block 712, the signature(s) of the new file system instance match the corresponding signature(s) backed up into the secondary storage system ("YES" at block 714), subtree integrity may be deemed verified. On the other hand, if the signatures do not match ("NO" at block 714), subtree integrity may be deemed unverified, and the primary storage system may return an error or perform an error handling routine. In some examples, a verified restored subtree may be considered to be free of corruption or modification.

At block 720, the primary storage system determines whether there are subtrees remaining to be restored. If there are remaining subtrees to be restored ("YES" at block 720), the primary storage system proceeds to the next subtree at block 722, and repeats blocks 706-720. If there are no remaining subtrees to be restored ("NO" at block 720), method 700 ends at block 724.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed:

1. A system comprising:
  a processing resource; and
  a machine readable medium storing instructions that, when executed by the processing resource, cause the processing resource to:
    initiate a backup of a file system instance of a primary storage system to a secondary storage system, wherein the primary storage system and the secondary storage system use different architectures, the secondary storage system stores unstructured data in items that are stored in data stores, and the file system instance hierarchically relates data objects by content-based signatures to a root object and includes subtrees that correspond to respective inodes of a consumable file system of the primary storage system;
    send a list of the content-based signatures to the secondary storage system; and
    store, during the backup, into at least one item in the secondary storage system designated for a subtree of the subtrees:
      metadata of the subtree, including a subtree root signature, and one or more data objects at a leaf level of the subtree sent to the secondary storage system as a stream, based on a determination of which signatures of data objects of the subtree from the list do not exist in a manifest of the secondary storage system so that the at least one item is deduplicated.

2. The system of claim 1, wherein the machine readable medium stores instructions that, when executed, cause the processing resource to store, during the backup, configuration data for the file system instance into an item in the secondary storage system designated for a subtree of the subtrees corresponding to a root inode.

3. The system of claim 1, wherein the machine readable medium stores instructions related to a restoration process that, when executed, cause the processing resource to:
    create a new file system instance;
    copy data objects from the at least one item in the secondary storage system into a corresponding new subtree of the new file system instance;
    calculate a new subtree root signature from data objects copied into the new subtree; and
    verify backup integrity based on a determination that the new subtree root signature matches the subtree root signature stored in the at least one item in the secondary storage system.

4. The system of claim 3, wherein the backup integrity is further verified based on a determination that signatures of an attribute object and an extended attribute object restored to the new subtree from the at least one item match signatures stored in the at least one item.

5. The system of claim 1, wherein the machine readable medium stores instructions that, when executed, cause the processing resource to manage concurrent storing of metadata and data objects of multiple subtrees of the file system instance into respective items in the secondary storage system.

6. The system of claim 1, wherein the machine readable medium stores instructions that, when executed, cause the processing resource to define a backup deduplication domain to the secondary storage system,
    wherein the secondary storage system configures a data store to exclusively contain items that store metadata and data object backups from the backup deduplication domain, and the manifest relates to the data store.

7. The system of claim 1, wherein the machine readable medium stores instructions that, when executed, cause the processing resource to coordinate the naming of the at least one item according to an inode corresponding to the subtree.

8. The system of claim 1, wherein the machine readable medium stores instructions that, when executed, cause the processing resource to request the secondary storage system to store the items from the secondary storage system to cloud storage.

9. A method comprising:
    initiating, by a primary storage system, a backup of a file system instance of the primary storage system to a secondary storage system, wherein the primary storage system and the secondary storage system use different architectures, the secondary storage system stores unstructured data in items that are stored in data stores, the file system instance hierarchically relates data objects by content-based signatures to a root object, and the file system instance includes subtrees that correspond to respective inodes of a consumable file system of the primary storage system;
    sending, by the primary storage system, a list of the content-based signatures to the secondary storage system; and
    storing, by the primary storage system, into at least one item in the secondary storage system associated with a subtree of the subtrees:
        metadata representing an inode corresponding to the subtree, including a subtree root signature, and
        data objects at a leaf level of the subtree sent to the secondary storage system as a stream, based on a determination of which signatures in the list of all data objects of the subtree do not exist in a manifest of the secondary storage system, so that the at least one item is deduplicated.

10. The method of claim 9, further comprising storing, by the primary storage system, into an item in the secondary storage system associated with specific subtree of the subtrees, configuration data for the file system instance and information about the respective inodes.

11. The method of claim 10, wherein the specific subtree corresponds to a root inode.

12. The method of claim 9, comprising performing a backup restoration process that includes:
    creating a new file system instance;
    copying data objects from the at least one item in the secondary storage system into a corresponding new subtree of the new file system instance using an allocation map that describes sparseness of the data objects;
    calculating a new subtree root signature from data objects copied into the new subtree; and
    verifying backup integrity based on a determination that the new subtree root signature matches the subtree root signature stored in the at least one item in the secondary storage system.

13. The method of claim 12, wherein the verifying the backup integrity includes verifying signatures of an attribute object and an extended attribute object restored to the new subtree from the at least one item.

14. The method of claim 9, wherein the storing into at least one item is performed in parallel for multiple subtrees of the file system instance of the primary storage system.

15. The method of claim 9, further comprising defining, by the primary storage system, a backup deduplication domain to the secondary storage system,
    wherein the secondary storage system configures a data store to exclusively contain items that store metadata and data object backups from the backup deduplication domain, and the manifest relates to the data store.

16. The method of claim 9, further comprising causing the at least one item to be named according to an inode corresponding to the subtree.

17. A non-transitory machine readable medium storing instructions that, when executed by a processing resource, cause the processing resource to:
    initiate backup of a file system instance of a primary storage system to a secondary storage system, wherein the primary storage system and the secondary storage system use different architectures, the secondary storage system stores unstructured data in items that are stored in data stores, and the file system instance hierarchically relates data objects by content-based signatures to a root object and the file system instance includes subtrees that correspond to respective inodes of a consumable file system of the primary storage system;

send a list of the content-based signatures to the secondary storage system;
store, during the backup, into at least one item in the secondary storage system designated for a subtree of the subtrees:
   metadata of the subtree, and
   one or more data objects at a leaf level of the subtree sent to the secondary storage system as a stream, based on a determination of which signatures from the list of data objects of the subtree do not exist in a manifest of the secondary storage system, so that the at least one item is deduplicated; and
store, during the backup, configuration data for the file system instance into an item in the secondary storage system designated for a subtree corresponding to a root inode.

18. The non-transitory machine readable medium of claim 17, further storing backup restoration instructions that cause the processing resource to:
   create a new file system instance; and
   copy data objects from the at least one item in the secondary storage system into a corresponding new subtree of the new file system instance using an allocation map that describes sparseness of the data objects.

19. The non-transitory machine readable medium of claim 18, further storing instructions that cause the processing resource to:
   calculate a new subtree root signature from data objects copied into the new subtree;
   calculate signatures of an attribute object and an extended attribute object copied to the new subtree from the at least one item; and
   verify backup integrity based on a determination that the new subtree root signature matches a subtree root signature included in the metadata stored into the at least one item or based on a determination that the signatures of the attribute object and the extended attribute object copied to the new subtree match signatures included in the metadata of the subtree stored into the at least one item.

20. The non-transitory machine readable medium of claim 17, further storing instructions that cause the processing resource to manage concurrent storing of metadata and data objects of multiple subtrees of the file system instance into respective items in the secondary storage system.

21. The method of claim 9, wherein the sending, by the first storage system, sends the list of the content-based signatures to the secondary storage system in subsets of content-based signatures that align with a chunk size that the secondary storage system uses to chunk the data stream for signature calculation.

22. The method of claim 9, wherein the secondary storage system is air gapped data protection for the primary storage system.

23. The method of claim 9, further comprising:
   creating a new file system instance;
   concurrently copying data objects from multiple items in the secondary storage system into respective new subtrees of the new file system instance using one or more allocation maps that describe sparseness of the data objects of the multiple items;
   calculating new subtree root signatures for the new subtrees; and
   verifying backup integrity based on a determination that the new subtree root signatures match corresponding subtree root signatures stored in the multiple items.

24. The method of claim 9, wherein the stream omits data objects that are holes.

* * * * *